US010999151B2

(12) United States Patent
T et al.

(10) Patent No.: US 10,999,151 B2
(45) Date of Patent: May 4, 2021

(54) APPARATUS, SYSTEM, AND METHOD FOR TOPOLOGY DISCOVERY ACROSS GEOGRAPHICALLY REDUNDANT GATEWAY DEVICES

(71) Applicant: Juniper Networks, inc., Sunnyvale, CA (US)

(72) Inventors: Gururaj Rao T, Sunnyvale, CA (US); Albin George, Sunnyvale, CA (US); Bharath Kumar G, Sunnyvale, CA (US); Kiran Kumar K, Sunnyvale, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 60 days.

(21) Appl. No.: 16/571,213

(22) Filed: Sep. 16, 2019

(65) Prior Publication Data
US 2021/0083944 A1    Mar. 18, 2021

(51) Int. Cl.
| | | |
|---|---|---|
| *H04L 12/24* | (2006.01) | |
| *H04L 12/66* | (2006.01) | |
| *H04L 29/06* | (2006.01) | |
| *H04L 12/46* | (2006.01) | |
| *H04L 29/12* | (2006.01) | |

(52) U.S. Cl.
CPC .......... *H04L 41/12* (2013.01); *H04L 12/4641* (2013.01); *H04L 12/66* (2013.01); *H04L 41/0668* (2013.01); *H04L 41/0893* (2013.01); *H04L 61/2007* (2013.01); *H04L 69/16* (2013.01)

(58) Field of Classification Search
CPC ..... H04L 41/12; H04L 69/16; H04L 12/4641; H04L 41/0893; H04L 41/0668; H04L 61/2007; H04L 12/66
See application file for complete search history.

(56) References Cited

U.S. PATENT DOCUMENTS

| | | | | |
|---|---|---|---|---|
| 8,074,256 | B2 * | 12/2011 | Valente ................... | H04L 41/22 726/1 |
| 2010/0257576 | A1 * | 10/2010 | Valente ................. | H04L 63/102 726/1 |
| 2020/0067792 | A1 * | 2/2020 | Aktas .................. | H04L 43/0829 |

\* cited by examiner

*Primary Examiner* — Walter J DiVito
(74) *Attorney, Agent, or Firm* — FisherBroyles, LLP

(57) ABSTRACT

A disclosed method may include (1) receiving, at a local gateway device included in a network, a query message that initiates a topology discovery process from a remote gateway device included in the network, (2) identifying, within the query message, at least one characteristic of a first interface included on the remote gateway device, (3) selecting, for the first interface, a second interface included on the local gateway device based at least in part on the characteristic of the first interface identified within the query message, and then (4) sending, to the remote gateway device, a response message that (A) includes at least one characteristic of the second interface included on the local gateway device and (B) enables the remote gateway device to map the first interface to the second interface in connection with the topology discovery process. Various other apparatuses, systems, and methods are also disclosed.

20 Claims, 8 Drawing Sheets

| Translation Table 230 | | |
|---|---|---|
| Local | Remote | Peer Connection IP |
| Interface 120 | Interface 122 | 101.1.1.2 |
| Interface 520 | Interface 530 | 103.3.3.1 |

| Translation Table 232 | | |
|---|---|---|
| Local | Remote | Peer Connection IP |
| Interface 122 | Interface 120 | 101.1.1.1 |
| Interface 522 | Interface 532 | 102.2.2.2 |

| Translation Table 630 | | |
|---|---|---|
| Local | Remote | Peer Connection IP |
| Interface 530 | Interface 520 | 103.3.3.2 |
| Interface 532 | Interface 522 | 102.2.2.1 |

*FIG. 6*

APPARATUS, SYSTEM, AND METHOD FOR TOPOLOGY DISCOVERY ACROSS GEOGRAPHICALLY REDUNDANT GATEWAY DEVICES

BACKGROUND

In today's world, uninterrupted Internet connectivity has become essential for many gateway and/or enterprise users. Gateway devices are often used to forward traffic within a network and/or across networks. These gateway devices may represent and/or form part of the essential infrastructure of such networks. In some examples, a set of gateway devices may each include and/or house various access interfaces. In such examples, these access interfaces may each be assigned to and/or provisioned for certain subscribers of a service provider that manages the set of gateway devices.

Unfortunately, such gateway devices may occasionally experience downtime for one reason or another. For example, a power outage may limit the amount of power that is available to a data center that houses various gateway devices in connection with the service provider. As a result, the subscribers whose traffic is forwarded by the access interfaces included in those gateway devices may be left—at least temporarily—without Internet connectivity unless the service provider is able to offer geographical redundancy.

The instant disclosure, therefore, identifies and addresses a need for additional and improved apparatuses, systems, and methods for topology discovery across geographically redundant gateway devices.

SUMMARY

As will be described in greater detail below, the instant disclosure generally relates to apparatuses, systems, and methods for topology discovery across geographically redundant gateway devices. In one example, a method for accomplishing such a task may include (1) receiving, at a local gateway device included in a network, a query message that initiates a topology discovery process from a remote gateway device included in the network, (2) identifying, within the query message, at least one characteristic of a first interface included on the remote gateway device, (3) selecting, for the first interface, a second interface included on the local gateway device based at least in part on the characteristic of the first interface identified within the query message, and then (4) sending, to the remote gateway device, a response message that (A) includes at least one characteristic of the second interface included on the local gateway device and (B) enables the remote gateway device to map the first interface to the second interface in connection with the topology discovery process.

Similarly, a system that implements the above-identified method may include a physical processor configured to execute various modules stored in memory. In one example, this system may include and/or execute (1) a receiving module that receives a query message that initiates a topology discovery process from a remote gateway device, (2) a mapping module that (A) identifies, within the query message, at least one characteristic of a first interface included on the remote gateway device and (B) selects, for the first interface, a second interface included on a local gateway device based at least in part on the characteristic of the first interface identified within the query message, and (3) a transmission module that sends, to the remote gateway device, a response message that (A) includes at least one characteristic of the second interface included on the local gateway device and (B) enables the remote gateway device to map the first interface to the second interface in connection with the topology discovery process.

Additionally or alternatively, an apparatus that implements the above-identified method may include at least one storage device that stores a translation table configured to identify geographical redundancy groups that handle traffic involving subscriber devices. The apparatus may also include at least one physical processor communicatively coupled to the storage device. In one example, the physical processor (1) receives, at a local gateway device included in a network, a query message that initiates a topology discovery process from a remote gateway device included in the network, (2) identifies, within the query message, at least one characteristic of a first interface included on the remote gateway device, (3) selects, for the first interface, a second interface included on the local gateway device based at least in part on the characteristic of the first interface identified within the query message, and then (4) sends, to the remote gateway device, a response message that (A) includes at least one characteristic of the second interface included on the local gateway device and (B) enables the remote gateway device to map the first interface to the second interface in connection with the topology discovery process.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is an illustration of exemplary translation tables of gateway devices that forward traffic in connection with broadband and/or home subscribers.

Figure 1:
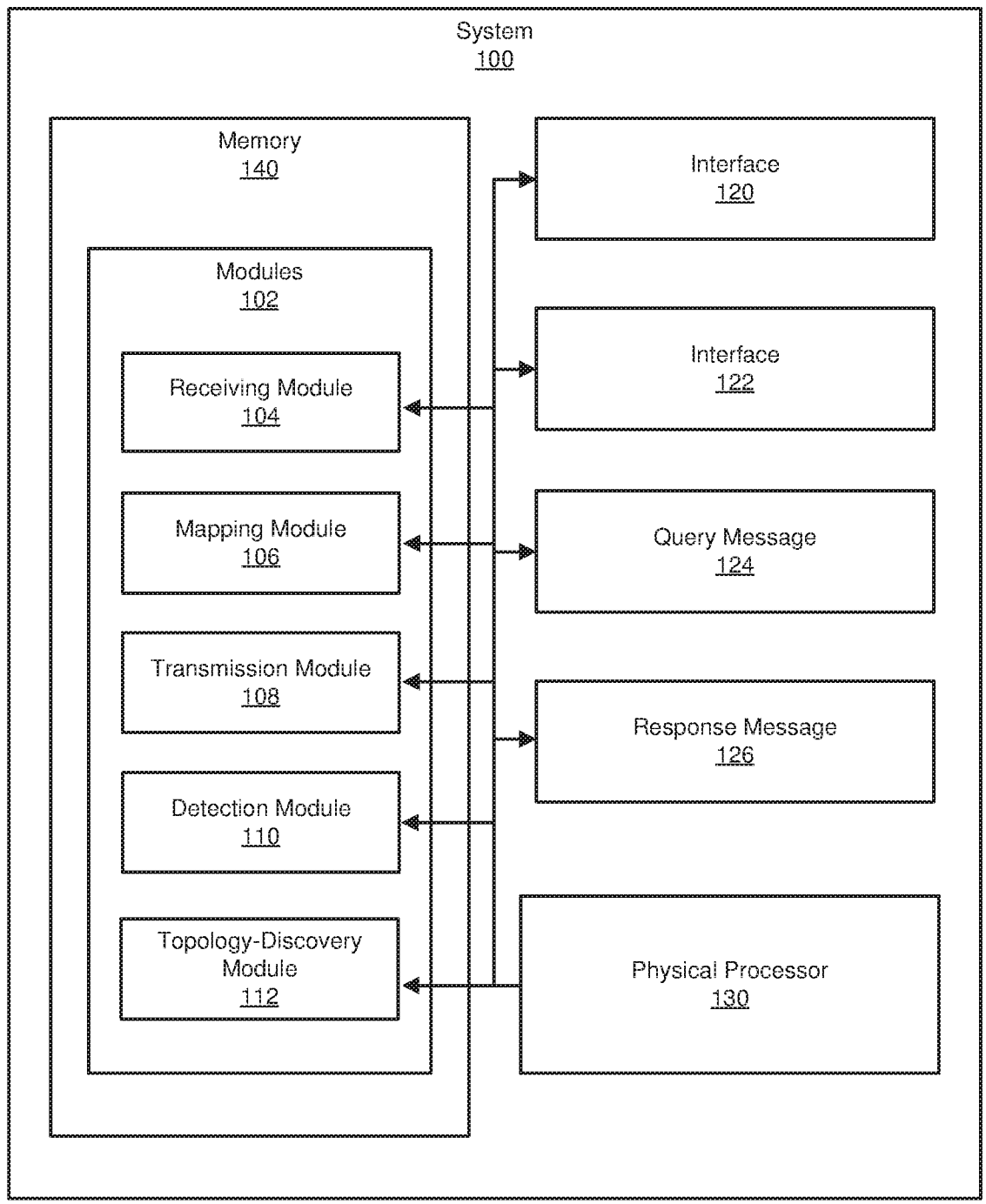
FIG. 1 is a block diagram of an exemplary system for topology discovery across geographically redundant gateway devices.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for topology discovery across geographically redundant gateway devices. As will be explained in greater detail below, embodiments of the instant disclosure may enable geographically redundant gateway devices to pair onboard access interfaces with one another. For example, a local gateway device may pair one of its access interfaces with an access interface included on a remote gateway device during a topology discovery process. In this example, the paired access interfaces may serve as a geographical redundancy group that is assigned to and/or provisioned for subscribers of a service provider.

In the geographical redundancy group, one of the paired access interfaces may serve as part of a primary path for the subscribers' traffic, and the other one of the paired access interfaces may serve as part of a backup path for the subscribers' traffic. Accordingly, embodiments of the instant disclosure may enable gateway devices situated at remote locations to form geographical redundancy groups that are able to provide primary and backup services and/or functions to the service provider's subscribers. By doing so, these embodiments may be able to provide and/or support substantially uninterrupted Internet service and/or failover protection for the service provider's subscribers even if a system and/or network failure brings down the primary access interface and/or its entire gateway device.

The following will provide, with reference to FIGS. 1, 2, 4, and 5 detailed descriptions of exemplary apparatuses, systems, and corresponding implementations for topology discovery across geographically redundant gateway devices. Detailed descriptions of exemplary translations tables installed on geographically redundant gateway devices will be provided in connection with FIG. 6. Detailed descriptions of an exemplary timing diagram related to a topology discovery process will be provided in connection with FIG. 7. Detailed descriptions of computer-implemented methods for topology discovery across geographically redundant gateway devices will be provided in connection with FIG. 3. In addition, detailed descriptions of an exemplary computing system for carrying out these methods will be provided in connection with FIG. 8.

FIG. 1 shows an exemplary system 100 that facilitates topology discovery across geographically redundant gateway devices. As illustrated in FIG. 1, system 100 may include one or more modules 102 for performing one or more tasks. As will be explained in greater detail below, modules 102 may include a receiving module 104, a mapping module 106, a transmission module 108, a detection module 110, and a topology-discovery module 112. Although illustrated as separate elements, one or more of modules 102 in FIG. 1 may represent portions of a single module, application, and/or operating system.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., gateway device 202 and/or gateway device 206). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate topology discovery across geographically redundant gateway devices. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include one or more interfaces, such as interface 120 and/or interface 122. In some examples, interface 120 and/or interface 122 may include and/or represent an access interface included on and/or incorporated into a gateway device. In one example, interface 120 and/or interface 122 may include and/or represent a physical interface that facilitates the flow of traffic within a network and/or across networks. In another example, interface 120 and/or interface 122 may include and/or represent a virtual interface partitioned on a physical interface of a gateway device. For example, a physical interface of a gateway device may be logically divided into multiple virtual interfaces.

In some examples, interface 120 and/or interface 122 may include and/or represent a Network Interface Card (NIC) that has direct connections with other interfaces within a network. Additional examples of interface 120 and/or interface 122 include, without limitation, Gigabit Ethernet (GE) interfaces, 10-Gigabit Ethernet (XE) interfaces, Ten GE interfaces, Asynchronous Transfer Mode (ATM) interfaces, Frame Relay interfaces, packet forwarding engines, routing engines, Physical Interface Cards (PICs), Flexible PIC Concentrators (FPCs), Switch Interface Boards (SIBs), control boards, communication ports, connector interface panels, line cards, egress interfaces, ingress interfaces, portions of one or more of the same, combinations or variations of one or more of the same, and/or any other suitable interface.

As illustrated in FIG. 1, exemplary system 100 may additionally include one or more messages, such as query message 124 and/or response message 126, exchanged between gateway devices. In some examples, query message 124 may be exchanged between gateway devices connected to an access network. In one example, query message 124 may initiate a topology discovery process involving those gateway devices. In another example, query message 124 may further an ongoing topology discovery process involving those gateway devices. Examples of query message 124 include, without limitation, Transmission Communication Protocol (TCP) packets, Internet Protocol (IP) packets, User Datagram Protocol (UDP) packets, Dynamic Host Configuration Protocol (DHCP) packets, layer 2 packets, layer 3 packets, combinations of one or more of the same, and/or any other suitable query message.

In some examples, response message 126 may be exchanged between gateway devices connected to an access network. In one example, response message 126 may further an ongoing topology discovery process involving those gateway devices. In another example, response message 126 may effectively complete a topology discovery process involving those gateway devices. Examples of response message 126 include, without limitation, TCP packets, IP packets, UDP packets, DHCP packets, layer 2 packets, layer 3 packets, combinations of one or more of the same, and/or any other suitable response message.

Figure 2:
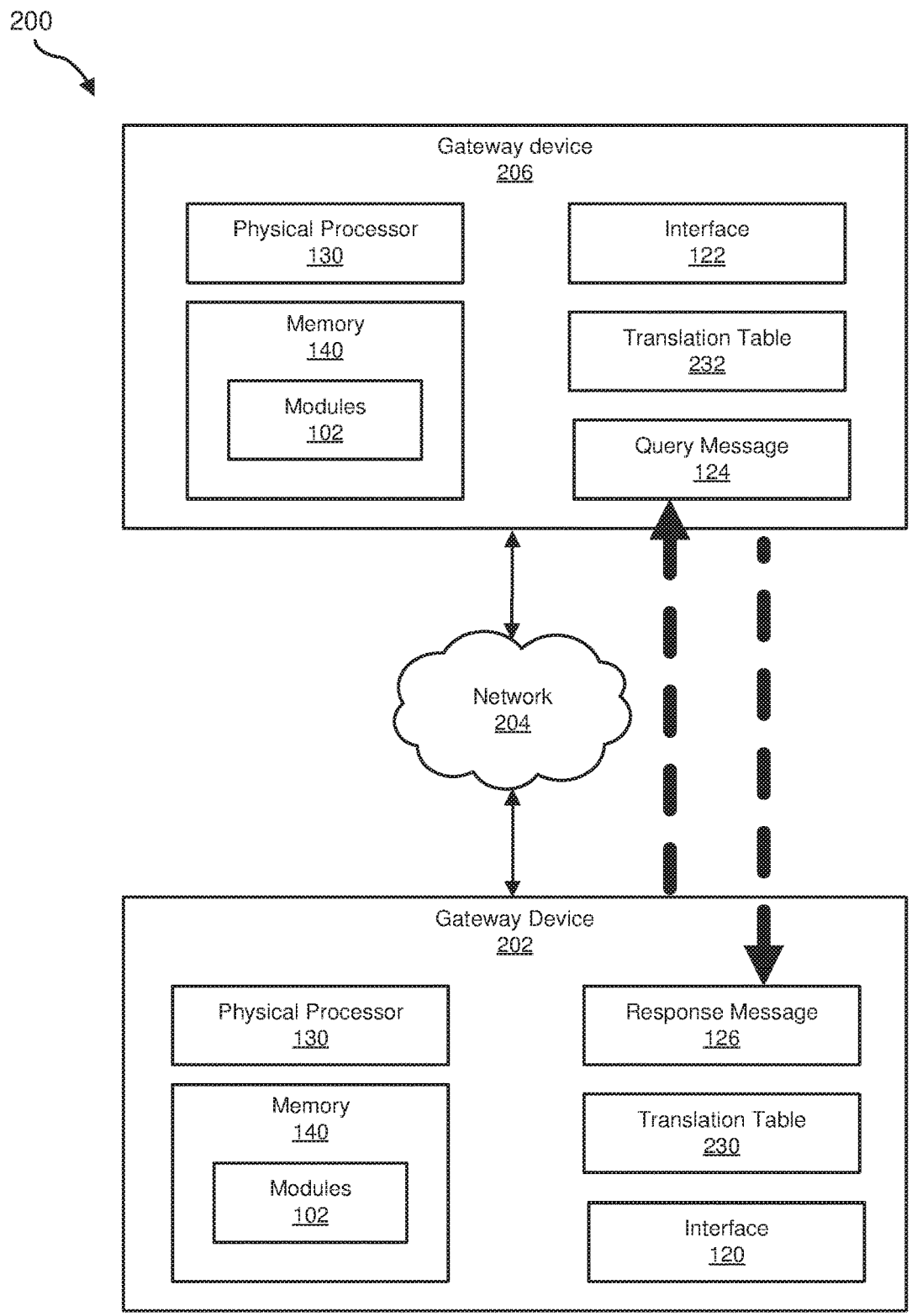
FIG. 2 is a block diagram of an additional exemplary system for topology discovery across geographically redundant gateway devices.

An apparatus for topology discovery across geographically redundant gateway devices may include all or portions of exemplary system 100. In some examples, system 100 in FIG. 1 may be implemented in a variety of ways. For example, all or a portion of exemplary system 100 may represent portions of exemplary system 200 in FIG. 2. As shown in FIG. 2, system 200 may include a gateway device 202 and a gateway device 206 in communication via a network 204.

As illustrated in FIG. 2, gateway device 202 may include and/or represent instances of memory 140, physical processor 130, and/or interface 120. Similarly, gateway device 206 may also include and/or represent instances of memory 140, physical processor 130, and/or interface 122. Although not necessarily illustrated in this way in FIG. 2, gateway devices 202 and 206 may each include and/or house various interfaces in addition to interfaces 120 and 122, respectively.

In one example, a direct link through network 204 may provide connectivity between gateway device 202 and gateway device 206. In another example, no direct link may necessarily exist between gateway device 202 and gateway device 206. In this example, an indirect link and/or a series of links through network 204 may provide connectivity between gateway device 202 and gateway device 206.

In some examples, and as will be described in greater detail below, one or more of modules 102 may cause gateway device 206 to (1) receive query message 124 that initiates a topology discovery process from gateway device 202, (2) identify, within query message 124, at least one characteristic of interface 120 included on gateway device 202, (3) select, for interface 120, interface 122 included on gateway device 206 based at least in part on the characteristic of interface 120 identified within query message 124, and then (4) send, to gateway device 202, response message 126 that (A) includes at least one characteristic of interface 122 included on gateway device 206 and (B) enables gateway device 202 to map interface 120 to interface 122 in connection with the topology discovery process.

Gateway device 202 and gateway device 206 each generally represent any type or form of physical computing device capable of reading computer-executable instructions and/or handling network traffic. In one example, gateway device 202 and/or gateway device 206 may each include and/or represent a Broadband Network Gateway (BNG) that receives, routes, forwards, and/or otherwise handles network traffic. Additionally or alternatively, gateway device 202 and/or gateway device 206 may provide a service provider's subscribers with access to a broadband network and/or the Internet. Additional examples of gateway device 202 and/or gateway device 206 include, without limitation, routers (such as provider edge routers, hub routers, spoke routers, autonomous system boundary routers, and/or area border routers), virtual routers, switches, hubs, modems, bridges, repeaters, gateways, multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable gateway devices.

In some examples, gateway device 202 and/or gateway device 206 may represent intermediate hops along a network path. Accordingly, gateway device 202 and/or gateway device 206 may not necessarily be the initial source and/or final destination of certain traffic. An apparatus for topology discovery across geographically redundant gateway devices may include and/or represent all or a portion of gateway device 202 or gateway device 206. In some embodiments, gateway devices 202 and 206 may run one or more routing protocol stacks, such as Border Gateway Protocol (BGP), Open Shortest Path First (OSPF), Intermediate System to Intermediate System (IS-IS), Multiprotocol Label Switching (MPLS), Label Distribution Protocol (LDP), Resource Reservation Protocol (RSVP), and/or Virtual Router Redundancy Protocol (VRRP).

Network 204 generally represents any medium or architecture capable of facilitating communication or data transfer. In one example, network 204 may include gateway device 202 and/or gateway device 206 even though these devices are illustrated external to network 204 in FIG. 2. Additionally or alternatively, network 204 may include other devices that facilitate communication among gateway device 202, gateway device 206, and/or subscriber devices (not necessarily illustrated in FIG. 2). Network 204 may facilitate communication or data transfer using wireless and/or wired connections. Examples of network 204 include, without limitation, an intranet, an access network, a layer 2 network, a layer 3 network, an MPLS network, an IP network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Although not illustrated in this way in FIG. 2, network 204 may also include additional devices (such as client devices, servers, network devices, etc.). For example, network 204 may include switches, Optical Line Termination (OLT) devices, DSLAM devices, MSAN devices, customer edge routers, modems, mobile networks concentrators (such as GGSNs and/or SGSNs), and/or any other devices capable of aggregating subscriber traffic. In one example, such devices may be multihomed to BNGs and/or gateway devices 202 and/or 204. Additionally or alternatively, network 204 may include access nodes connected to BNGs and/or gateway devices 202 and/or 204. In this example, the connections between such access nodes and the BNGs may be direct or indirect using any type or form of tunneling mechanism (e.g., MPLS LSP, GRE, L2TP, IP in IP, GTP, etc.).

Figure 3:
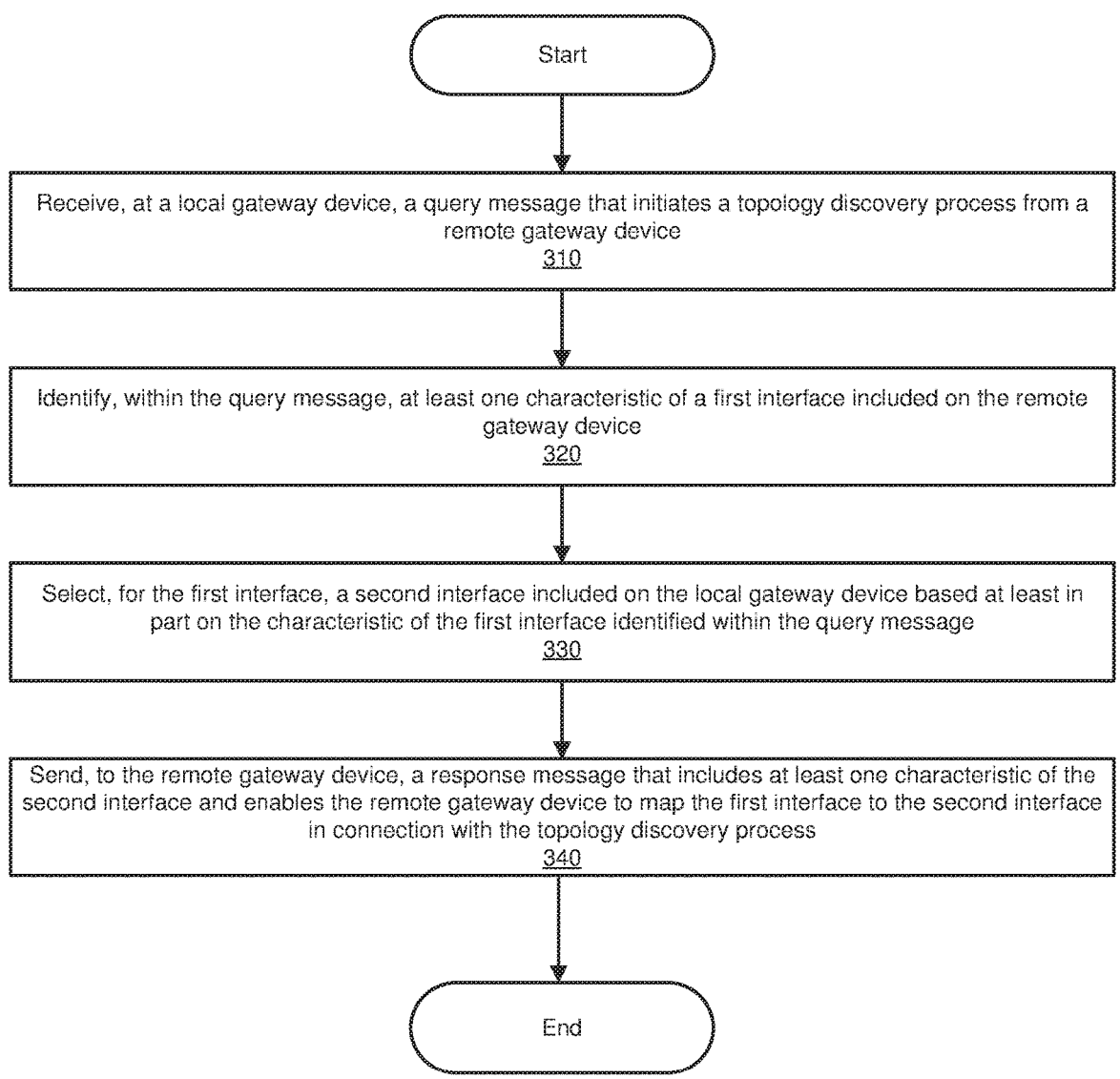
FIG. 3 is a flow diagram of an exemplary method for topology discovery across geographically redundant gateway devices.

FIG. 3 is a flow diagram of an exemplary computer-implemented method 300 for topology discovery across geographically redundant gateway devices. The steps shown in FIG. 3 may be performed by any suitable computer-executable code and/or computing system, including system 100 in FIG. 1, system 200 in FIG. 2, system 400 in FIG. 4, system 500 in FIG. 5, system 800 in FIG. 8, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may receive, at a local gateway device included in a network, a query message that initiates a topology discovery process from a remote gateway device included in the network. For example, receiving module 104 may, as part of gateway device 206 in FIG. 2, receive query message 124 from gateway device 202 in FIG. 2. In this example, query message 124 may initiate a topology discovery process between gateway devices 202 and 206.

In some examples, a topology discovery process may include and/or represent the act and/or procedure for matching and/or pairing interfaces included on gateway devices 202 and 206 with one another for the purpose of providing geographical redundancy and/or backup services to subscribers of a service provider. Accordingly, the topology discovery process may be able to form and/or assemble groups of geographically diverse gateway devices and/or interfaces to support and/or sustain uninterrupted Internet access and/or connectivity for the service provider's subscribers.

In some examples, gateway devices 202 and 206 may be physically situated at distinct geographical locations. For example, gateway device 202 may be located in one building or city, and gateway device 206 may be located in another building or city. As a result, an event (e.g., a power outage and/or system failure) that affects the building or city where gateway device 202 is located may not necessarily affect the other building or city where gateway device 206 is located, and vice versa. Put another way, gateway device 202 may reside at a remote geographical location, and gateway device 206 may reside at a local geographical location.

Query message 124 may include and/or contain a variety of different information and/or data. Examples of such information and/or data include, without limitation, a transaction identifier, a client identifier for the corresponding gateway device, an interface identifier for the querying interface, an interface name for the querying interface, vendor specific options or sub-options, a string or value indicative of topology discovery, a subnet address of the querying interface, an IP addresses of the querying interface, a Virtual Local Area Network (VLAN) identifier of the querying interface, a routing instance of querying interface, a shared key with which the querying interface is tagged, combinations and/or variations of one or more of the same, and/or any other suitable information and/or data.

The systems described herein may perform step 310 in a variety of ways and/or contexts. In some examples, receiving module 104 may monitor gateway device 206 for query messages. While monitoring gateway device 206 in this way, receiving module 104 may detect query message 124 as it arrives at gateway device 206 from gateway device 202 via network 204. In one example, network 204 may include and/or represent a heterogenous network that supports a plurality of communication types, such as layer 2 communications, layer 3 communications, IP communications, and/or or MPLS communications. As query message 124 arrives at gateway device 206 in this way, receiving module 104 may receive query message 124.

In some examples, gateway device 202 may send query message 124 to gateway device 206 via network 204 to initiate a topology discovery process. This topology discovery process may be triggered in a variety of different ways and/or contexts. For example, detection module 110 may, as part of gateway device 202, detect an event that triggers the topology discovery process. Examples of such a triggering event include, without limitation, the addition of a new gateway device to the network (e.g., network 204), the restoration of a connection involving a communication interface included on gateway device 206, the rebooting of at least one gateway device (e.g., gateway device 202 and/or gateway device 206) included in the network, a topology change affecting the network, a change in redundancy protocol mastership, a change in the configuration of topology discovery, a restarting of topology discovery, an in-service software upgrade, the clearing and/or deletion of a translation table, a manual administrative instruction to perform topology discovery, combinations or variations of one or more of the same, and/or any other suitable triggering event.

In response to the detection of this triggering event, topology-discovery module 112 may, as part of gateway device 202, initiate the topology discovery process. As part of this topology discovery process, topology-discovery module 112 may direct transmission module 108 to send query message 124 from gateway device 202 to gateway device 206 via network 204. As query message 124 arrives at gateway device 206, receiving module 104 may receive query message 124 to initiate and/or further the topology discovery process on gateway device 206.

In some examples, transmission module 108 may send query message 124 via TCP or UDP. Accordingly, receiving module 104 may receive query message 124 via TCP or UDP.

Returning to FIG. 3, at step 320 one or more of the systems described herein may identify, within the query message, at least one characteristic of a first interface included on the remote gateway device in response to receiving the query message. For example, mapping module 106 may, as part of gateway device 206 in FIG. 2, identify one or more characteristics of interface 120 within query message 124. In this example, the identification of these characteristics may be initiated and/or performed in response to the receipt of query message 124. Examples of such characteristics include, without limitation, an IP address of interface 120, a subnet address of interface 120, a device type of interface 120, a VLAN identifier of interface 120, a routing instance of interface 120, a shared key with which interface 120 is tagged, combinations or variations of one or more of the same, and/or any other suitable characteristics.

The systems described herein may perform step 320 in a variety of ways and/or contexts. In some examples, mapping module 106 may search query message 124 for matching criteria and/or topology discovery information associated with interface 120 included on gateway device 202. For example, mapping module 106 may search one or more headers (such as a DHCP header and/or an IP header) of query message 124 and/or the body of query message 124 for such matching criteria and/or topology discovery information. During this search, mapping module 106 may identify one or more of the characteristics of interface 120 included and/or contained in query message 124. In this example, these characteristics of interface 120 may amount to and/or represent matching criteria and/or topology discovery information associated with interface 120.

Returning to FIG. 3, at step 330 one or more of the systems described herein may select, for the first interface, a second interface included on the local gateway device based at least in part on the characteristic of the first interface identified within the query message. For example, mapping module 106 may, as part of gateway device 206 in FIG. 2, select interface 122 for interface 120 as part of the topology discovery process in response to the receipt of query message 124. In this example, interfaces 120 and 122 may subsequently form and/or represent a geographically redundant grouping that provides and/or facilitates uninterrupted Internet connectivity and/or failover protection for one or more of the service provider's subscribers.

The systems described herein may perform step 330 in a variety of ways and/or contexts. In some examples, mapping module 106 may select interface 122 from a plurality of interfaces included on gateway device 206. Mapping module 106 may select interface 122 based at least in part on any suitable criteria. For example, mapping module 106 may select interface 122 based at least in part on the availability and/or eligibility of those interfaces on gateway device 206. In another example, mapping module 106 may select interface 122 at random from those interfaces available and/or eligible for pairing on gateway device 206.

In some examples, mapping module 106 may select interface 122 based at least in part on certain features that match and/or coincide with those of interface 120. For example, mapping module 106 may select interface 122 based at least in part on the bandwidth capacity of interface 122. In this example, mapping module 106 may determine that the bandwidth capacity of interface 122 is similar and/or identical to that of interface 120. Mapping module 106 may then map interface 122 to interface 120 due at least in part to the similarity and/or identicalness of their respective bandwidth capacities.

Additionally or alternatively, mapping module 106 may select interface 122 based at least in part on its device type. In one example, mapping module 106 may determine that the device type of interface 122 is similar and/or identical to that of interface 120. For example, mapping module 106 may determine that both of interfaces 120 and 122 are Gigabit Ethernet (GE) interfaces. In another example, mapping module 106 may determine that both of interfaces 120 and 122 are 10-Gigabit Ethernet (XE) interfaces. Mapping module 106 may then map interface 122 to interface 120 due at least in part to the similarity and/or identicalness of their respective device types.

In some examples, mapping module 106 may select interface 122 for interface 120 by pairing interface 122 and interface 120 based at least in part on the one or more characteristics identified within query message 124. For example, mapping module 106 may configure interface 122 to share such characteristics with interface 120. As a specific example, mapping module 106 may program and/or tag interface 122 with the VLAN identifier, subnet address, and/or routing instance identified within query message 124. Additionally or alternatively, mapping module 106 may program interface 122 with the shared key (e.g., a numerical or string value) identified within query message 124.

In some examples, mapping module 106 may record the mapping between interface 120 and interface 122 in a translation table 232 of gateway device 206. In one example, the record of the mapping may identify and/or store the interface identifiers and/or names of interfaces 120 and 122. Additionally or alternatively, the record of the mapping may identify and/or store the IP and/or subnet address of interface 122 on gateway device 206.

In some examples, mapping module 106 may select interface 122 using matching subnets. For example, mapping module 106 may select interface 122 by mapping the subnet address of interface 120 and VLAN identifier of interface 120 to the corresponding subnet address of interface 122 and VLAN identifier of interface 122. In other examples, mapping module 106 may select interface 122 using the matching shared key. For example, mapping module 106 may select interface 122 by mapping interface 120 and interface 122 to one another via the shared key included in query message 124.

Returning to FIG. 3, at step 340 one or more of the systems described herein may send, to the remote gateway device, a response message that includes at least one characteristic of the second interface and enables the remote gateway device to map the first interface to the second interface in connection with the topology discovery process. For example, transmission module 108 may, as part of gateway device 206 in FIG. 2, send response message 126 to gateway device 202 via network 204. In this example, response message 126 may include and/or identify at least one characteristic of interface 122 included on gateway device 206. Additionally or alternatively, response message 126 may enable gateway device 206 to map interface 120 to interface 122 in connection with the topology discovery process.

In some examples, response message 126 may further and/or advance the ongoing topology discovery process. In other examples, response message 126 may effectively complete, end, and/or terminate the topology discovery process.

Response message 126 may include and/or contain a variety of different information and/or data. Examples of such information and/or data include, without limitation, a transaction identifier, a client identifier for the corresponding gateway device, an interface identifier for the matching interface, an interface name for the matching interface, vendor specific options or sub-options, a string or value indicative of topology discovery, a subnet address of the matching interface, an IP addresses of the matching interface, a VLAN identifier of the matching interface, a routing instance of the matching interface, a shared key with which the matching interface is tagged, combinations and/or variations of one or more of the same, and/or any other suitable information and/or data.

In some examples, response message 126 may be marked with a Time To Live (TTL) value (e.g., 1 or higher). This TTL value may ensure and/or indicate that gateway devices 202 and 206 are directly connected to one another. For example, the TTL may decrement at every hop along the way. In this example, if any device along the way receives response message 126 with a TTL value of zero, that device may drop response message 126 without forwarding the same.

The systems described herein may perform step 340 in a variety of ways and/or contexts. In some examples, transmission module 108 may send response message 126 from gateway device 206 to gateway device 202 via network 204. As response message 126 arrives at gateway device 202, receiving module 104 may, as part of gateway device 202, receive response message 126 to further and/or complete the topology discovery process on gateway device 202.

In some examples, transmission module 108 may send response message 126 via TCP or UDP. Accordingly, receiving module 104 may receive response message 126 via TCP or UDP.

In some examples, gateway device 202 may perform any of the various steps, methods, and/or processes described above in connection with gateway device 206 and/or FIG. 3. For example, mapping module 106 may, as part of gateway device 202, record the mapping between interface 120 and interface 122 in a translation table 230 of gateway device 202. In one example, the record of the mapping may identify and/or store the interface identifiers and/or names of interfaces 120 and 122. Additionally or alternatively, the record of the mapping may identify and/or store the IP or subnet address of interface 122 on gateway device 206.

In some examples, the topology discovery process may terminate once gateway devices 202 and 206 have learned the topology involved in the geographically redundant group that includes interfaces 120 and 122. In one example, this topology discovery process may be completed by exchanging only query message 124 and response message 126. However, in another example, this topology discovery process may be completed by exchanging not only query message 124 and response message 126 but also an additional query message and an additional response message. For example, gateway device 206 may send an additional query message to gateway device 202, and gateway device 202 may return an additional response message to gateway device 206.

Figure 4:
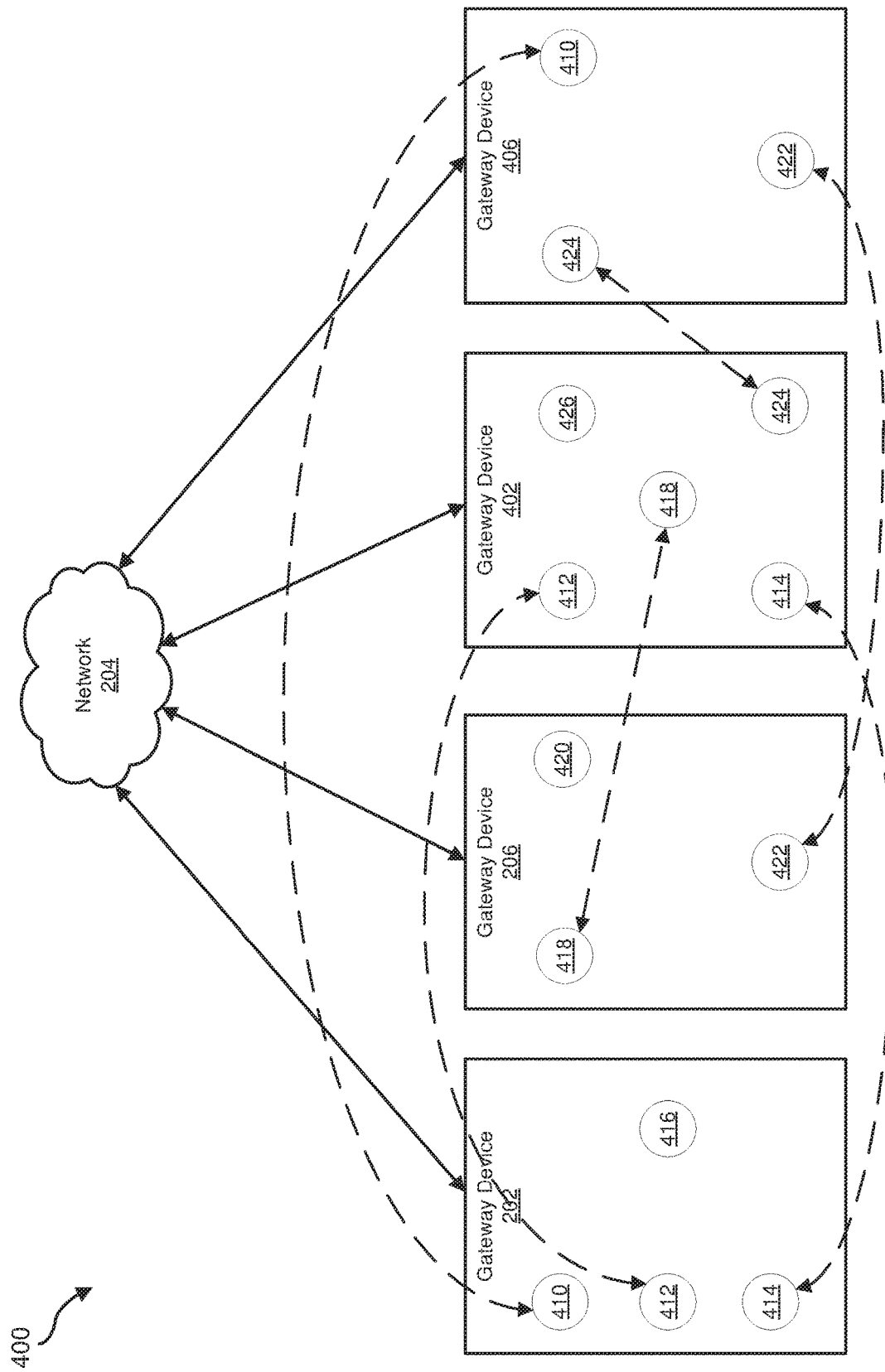
FIG. 4 is a block diagram of an additional exemplary system for topology discovery across geographically redundant gateway devices.

In some examples, the purpose for the topology discovery process may be to provide and/or facilitate geographically redundant gateway services for subscribers of the service provider. FIG. 4 is a block diagram of an exemplary system 400 for providing and/or facilitating geographically redundant gateway services. As illustrated in FIG. 4, system 400 may include and/or represent gateway devices 202, 206, 402, and 406 in communication via network 204. In one example, gateway devices 202, 206, 402, and 406 may each reside at a different physical location.

In addition, system 400 may include and/or represent subscriber redundancy groups 410, 412, 414, 418, 422, and 424. In one example, each of these subscriber redundancy groups may include and/or represent a primary interface on one gateway device and a backup interface on another gateway device. For example, subscriber redundancy group 410 may include and/or represent a primary interface on gateway device 202 and a backup interface on gateway device 406. In another example, subscriber redundancy group 418 may include and/or represent a primary interface on gateway device 402 and a backup interface on gateway device 206.

As illustrated in FIG. 4, system 400 may also include and/or represent non-redundant subscriber interfaces 416, 420, and 426. In one example, these non-redundant subscriber interfaces may be unable to provide and/or achieve backup protection and/or services. As a result, if an event disturbs and/or interrupts these non-redundant subscriber interfaces, the corresponding subscribers may be left temporarily without Internet access and/or connectivity.

Figure 5:
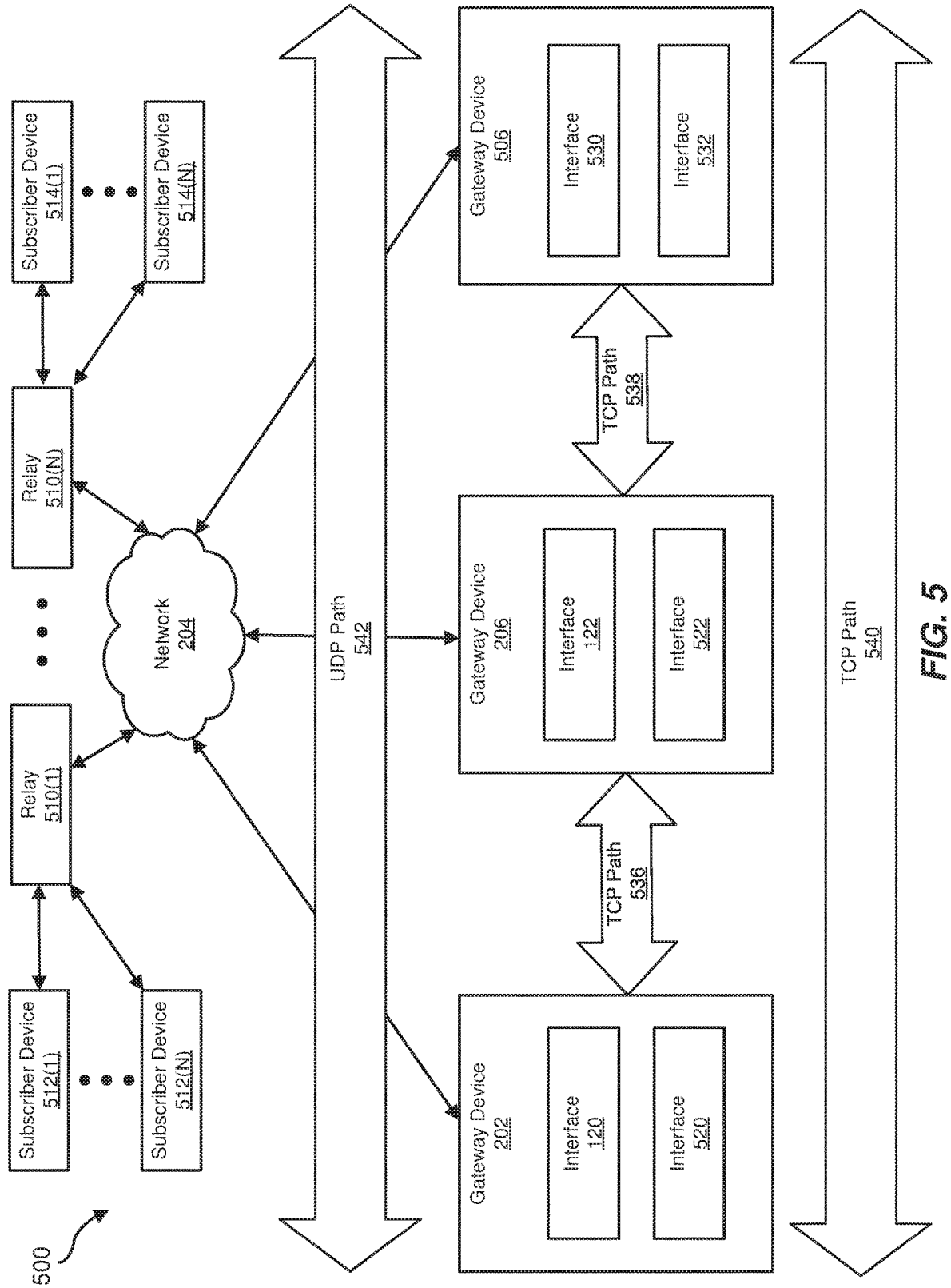
FIG. 5 is a block diagram of an additional exemplary system for topology discovery across geographically redundant gateway devices.

FIG. 5 is a block diagram of an exemplary system 500 for topology discovery across geographically redundant gateway devices. As illustrated in FIG. 5, system 500 may include and/or represent gateway devices 202, 206, and 506 and relays 510(1)-(N) in communication via network 204. In one example, relay 510(1) may connect and/or link subscriber devices 512(1)-(N) to network 204. In this example, relay 510(N) may connect and/or link subscriber devices 514(1)-(N) to network 204.

As illustrated in FIG. 5, gateway device 202 may include and/or house interfaces 120 and 520, and gateway device 206 may include and/or house interfaces 122 and 522. In addition, gateway device 506 may include and/or house interfaces 530 and 532. In one example, gateway devices 202, 206, and/or 506 may be able to exchange query messages and/or response messages across and/or via one or more of TCP paths 536, 538, and/or 540. In this example, TCP paths 536, 538, and/or 540 may include and/or represent directly connected links, access networks (via access nodes), and/or core networks that provide Internet connectivity to subscribers. Additionally or alternatively, gateway devices 202, 206, and/or 506 may be able to exchange query messages and/or response messages across and/or via a UDP path 542.

In one example, mapping module 106 may form and/or assemble a geographical redundancy group that includes gateway devices 202 and 206. In this example, mapping module 106 may assign the geographical redundancy group to one or more of subscriber devices 512(1)-(N). As a result of this assignment, gateway device 202 may serve as the primary node that handles traffic involving those subscriber devices 512(1)-(N) by default. In addition, gateway device 206 may serve as the backup node that handles traffic involving those subscriber devices 512(1)-(N) if gateway device 202 fails.

For example, transmission module 108 may initially direct traffic involving subscriber device 512(1) to gateway device 202 because it is the primary node included in the default path. In this example, detection module 110 may detect a failure (e.g., a power outage or system malfunction) that prevents gateway device 202 from forwarding the traffic involving subscriber device 512(1). In response to the detection of this failure, transmission module 108 may redirect the traffic involving subscriber device 512(1) to gateway device 206 because it is the backup node included in the backup path that handles such traffic if gateway device 202 fails.

FIG. 6 is an illustration of exemplary translation tables 230, 232, and 630. In one example, translation table 230 may be installed and/or included on gateway device 202 in FIG. 5, and translation table 232 may be installed and/or included on gateway device 206 in FIG. 5. In this example, translation table 630 may be installed and/or included on gateway device 506 in FIG. 5.

As illustrated in FIG. 6, translation tables 230, 232, and 630 may include and/or store records or entries for geographically redundant groupings assigned to subscribers of a service provider. In one example, one record or entry of translation table 230 may identify a geographically redundant group that includes interfaces 120 and 122. In this example, the record or entry may also identify the local IP address for this peer connection as "101.1.1.2". Continuing with this example, another record or entry of translation table 230 may identify a geographically redundant group that includes interfaces 520 and 530. This other record or entry may also identify the local IP address for this other peer connection as "103.3.3.1".

As illustrated in FIG. 6, one record or entry of translation table 232 may identify a geographically redundant group that includes interfaces 122 and 120. In this example, the record or entry may also identify the local IP address for this peer connection as "101.1.1.1". Continuing with this example, another record or entry of translation table 232 may identify a geographically redundant group that includes interfaces 522 and 532. This other record or entry may also identify the local IP address for this other peer connection as "102.2.2.2".

As illustrated in FIG. 6, one record or entry of translation table 630 may identify a geographically redundant group that includes interfaces 530 and 520. In this example, the record or entry may also identify the local IP address for this peer connection as "103.3.3.2". Continuing with this example, another record or entry of translation table 630 may identify a geographically redundant group that includes interfaces 532 and 522. This other record or entry may also identify the local IP address for this other peer connection as "102.2.2.1".

Figure 7:
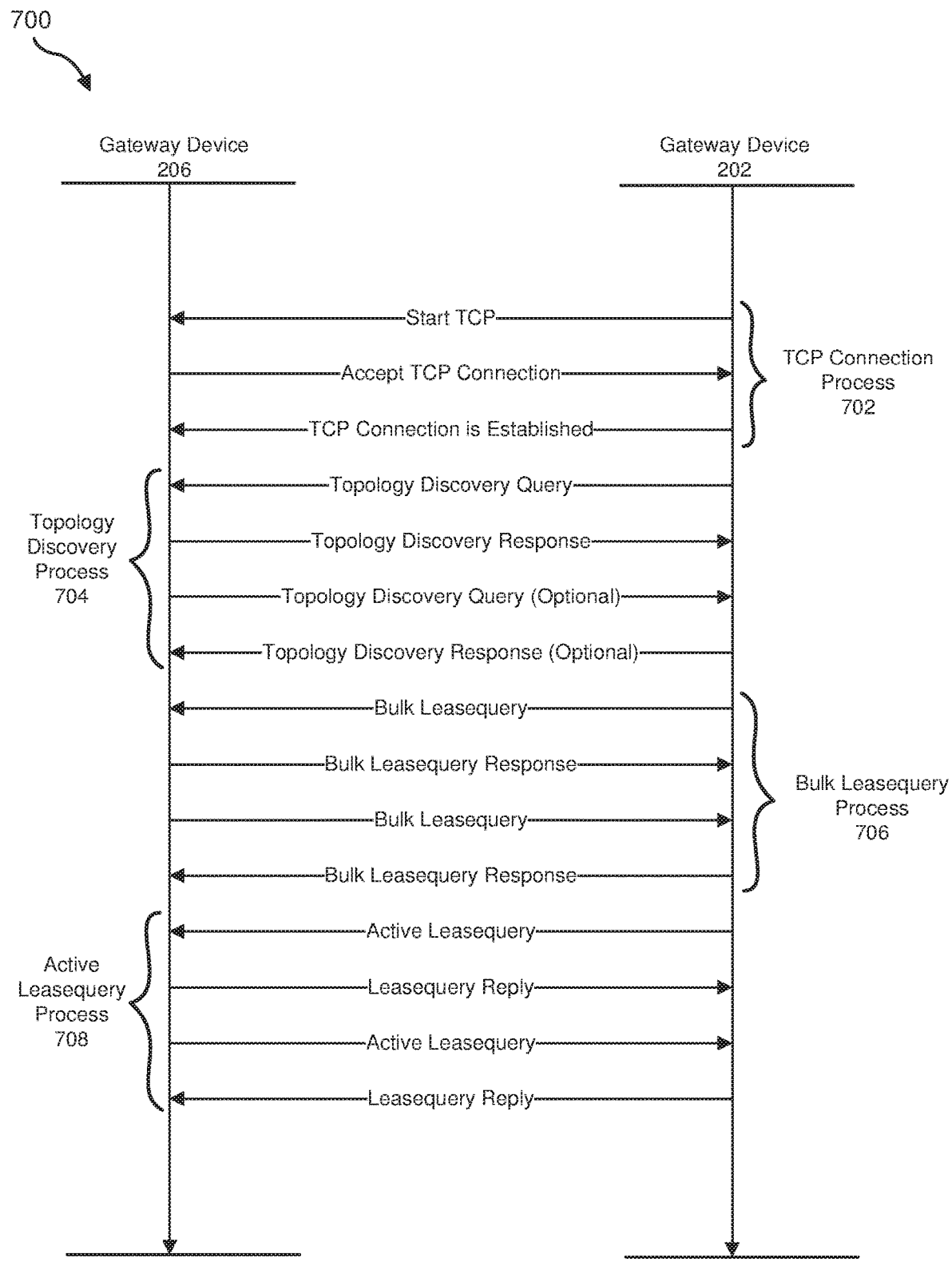
FIG. 7 is an illustration of an exemplary timing diagram of a topology discovery process for providing geographical redundancy in connection with broadband and/or home subscribers.

FIG. 7 is an illustration of an exemplary timing diagram 700 that demonstrates the positioning and composition of a topology discovery process 704 relative to a TCP connection process 702, a bulk leasequery process 706, and an active leasequery process 708. As illustrated in FIG. 7, topology discovery process 704 may include and/or represent at least one topology discovery query and at least one topology discovery response.

As a specific example, if topology discovery process 704 relies on matching subnets to pair gateway devices 202 and 206, topology discovery process 704 may include and/or represent two topology discovery queries (e.g., one from gateway device 202 and another from gateway device 206) and two topology discovery responses (e.g., one from gateway device 202 and another from gateway device 206). In this example, each topology discovery query may be sent and/or received via a TCP connection, and each topology discovery response may be sent and/or received via a UDP connection. By doing so, gateway devices 202 and 206 may ensure that they are directly connected to one another via the access network, as the receipt of the topology discovery query alone does not necessarily guarantee that gateway devices 202 and 206 are directly connected to one another. Accordingly, if topology discovery process 704 relies on matching subnets to pair gateway devices 202 and 206, each of gateway devices 202 and 206 may send their own query and response separately to learn the topology.

As another example, if topology discovery process 704 relies on matching the shared key, topology discovery process 704 may include and/or represent only one topology discovery query and only one topology discovery response. In this example, the topology discovery query may be sent and/or received via a TCP connection, and the topology discovery response may also be sent and/or received via the TCP connection. By doing so, gateway devices 202 and 206 may ensure that they are directly connected via the access network. Accordingly, if topology discovery process 704 relies on matching the shared key to pair gateway devices 202 and 206, gateway devices 202 and 206 may not necessitate the sending of separate queries and responses to learn the topology.

As illustrated in FIG. 7, timing diagram 700 may begin with TCP connection process 702 that establishes the TCP connection between gateways devices 202 and 206. Upon completion of TCP connection process 702, timing diagram 700 may continue with the initiation of topology discovery process 704. Upon completion of topology discovery process 704, timing diagram 700 may follow with bulk leasequery process 706. Finally, upon completion of bulk leasequery process 706, timing diagram 700 may terminate with active leasequery process 708.

In some examples, topology discovery process 704 may involve running one or more redundancy protocols (such as VRRP, MC-LAG, L2VPN, L3VPN, L2Circuit, etc.) to determine which of gateway device 202 and gateway device 206 is the primary node and/or which of gateway device 202 and gateway device 206 is the backup node.

Although many of the foregoing methods are described from the perspective of gateway device 206, gateway device 202 may perform the same methods in connection with the topology discovery processes. For example, one or more of modules 102 may cause gateway device 202 to (1) receive a query message that initiates a topology discovery process from gateway device 206, (2) identify, within the query message, at least one characteristic of a first interface included on gateway device 206, (3) selects, for the first interface, a second interface included on the gateway device 202 based at least in part on the characteristic of the first interface identified within the query message, and then (4) sends, to the gateway device 206, a response message that (A) includes at least one characteristic of the second interface included on the gateway device 202 and (B) enables gateway device 206 to map the first interface to the second interface in connection with the topology discovery process.

Figure 8:
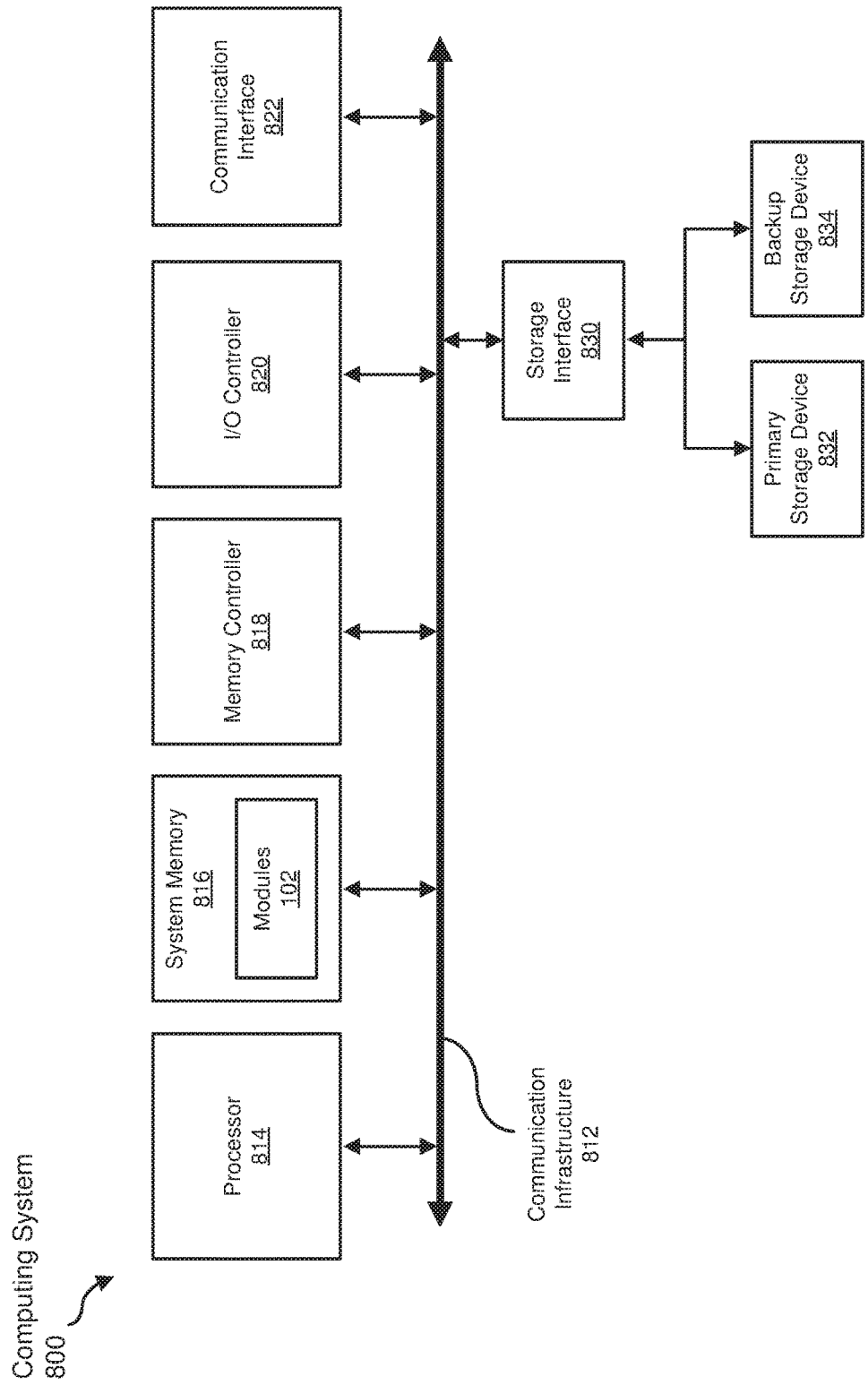
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 3. All or a portion of computing system 800 may also perform and/or be a means for performing and/or implementing any other steps, methods, or processes described and/or illustrated herein.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an application-specific integrated circuit (ASIC), a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   receiving, at a local gateway device included in a network, a query message that initiates a topology discovery process from a remote gateway device included in the network;
   in response to receiving the query message:
      identifying, within the query message, at least one characteristic of a first interface included on the remote gateway device; and
      selecting, for the first interface, a second interface included on the local gateway device based at least in part on the characteristic of the first interface identified within the query message;
   sending, to the remote gateway device, a response message that:
      includes at least one characteristic of the second interface included on the local gateway device; and
      enables the remote gateway device to map the first interface to the second interface in connection with the topology discovery process.

2. The method of claim 1, wherein mapping the first interface to the second interface comprises recording the mapping between the first interface and the second interface in a translation table of the remote gateway device.

3. The method of claim 1, further comprising:
   detecting, at the local gateway device, an event that triggers an additional topology discovery process; and
   in response to detecting the event, initiating the additional topology discovery process.

4. The method of claim 3, wherein the event that triggers the additional topology discovery process comprises at least one of:
   an addition of a new gateway device to the network;
   a restoration of a connection involving a communication interface included on the local gateway device;
   a reboot of at least one gateway device included in the network; and
   a topology change affecting the network.

5. The method of claim 1, further comprising:
   sending, from the local gateway device, an additional query message that prompts the remote gateway device to provide an additional response message that facilitates completing the topology discovery process;
receiving, from the remote gateway device, the additional response message that facilitates completing the topology discovery process;
in response to receiving the additional response message:
identifying, within the additional response message, at least one characteristic of the first interface included on the remote gateway device; and
updating a translation table of the local gateway device based at least in part on the characteristic of the first interface identified within the additional response message by recording the mapping between the first interface and the second interface in the translation table of the local gateway device.

6. The method of claim 1, wherein:
receiving the query message from the remote gateway device comprises receiving the query message via a Transmission Communication Protocol (TCP); and
sending the response message to the remote gateway device comprises sending the response message via the TCP or a User Datagram Protocol (UDP).

7. The method of claim 1, wherein:
the local gateway device resides at a local geographical location; and
the remote gateway device resides at a remote geographical location that is geographically separated from the local geographical location by at least a certain threshold.

8. The method of claim 7, further comprising:
forming a geographical redundancy group that includes the local gateway device and the remote gateway device; and
assigning the geographical redundancy group to a subscriber device such that:
one of the local gateway device and the remote gateway device serves as a primary node that handles traffic involving the subscriber device by default; and
another one of the local gateway device and the remote gateway device serves as a backup node that handles traffic involving the subscriber device if the primary node fails.

9. The method of claim 8, further comprising:
directing traffic involving the subscriber device to the primary node; and
detecting a failure that prevents the primary node from forwarding the traffic involving the subscriber device; and
in response to detecting the failure, directing the traffic involving the subscriber device to the backup node.

10. The method of claim 1, wherein selecting the second interface included on the local gateway device for the first interface comprises pairing the second interface with the first interface by configuring the second interface to share the characteristic identified within the query message with the first interface.

11. The method of claim 10, wherein configuring the second interface to share the characteristic identified within the query message with the first interface comprises programming the second interface with at least one of:
a Virtual Local Area Network (VLAN) identifier associated with the first interface;
a subnet address of the first interface; and
a routing instance of the first interface.

12. The method of claim 10, wherein configuring the second interface to share the characteristic identified within the query message with the first interface comprises programming the second interface with a shared key identified within the query message.

13. The method of claim 1, wherein the characteristic of the first interface identified within the query message comprises at least one of:
an IP address of the first interface;
a subnet address of the first interface;
a VLAN identifier of the first interface;
a routing instance of the first interface; and
a shared key with which the first interface is tagged.

14. The method of claim 1, wherein the network comprises a heterogenous network that supports a plurality of communication types including at least one of:
layer 2 communications;
layer 3 communications;
Internet Protocol (IP) communications; and
Multiprotocol label switching (MPLS) communications.

15. A system comprising:
a receiving module, stored in memory at a local gateway device included in a network, that receives a query message that initiates a topology discovery process from a remote gateway device included in the network;
a mapping module, stored in memory at the local gateway device, that:
in response to the query message:
identifies, within the query message, at least one characteristic of a first interface included on the remote gateway device; and
selects, for the first interface, a second interface included on the local gateway device based at least in part on the characteristic of the first interface identified within the query message;
a transmission module, stored in memory at the local gateway device, that sends, to the remote gateway device, a response message that:
includes at least one characteristic of the second interface included on the local gateway device; and
enables the remote gateway device to map the first interface to the second interface in connection with the topology discovery process; and
at least one physical processor configured to execute the receiving module, the mapping module, and the transmission module.

16. The system of claim 15, wherein the mapping module records the mapping between the first interface and the second interface in a translation table of the remote gateway device.

17. The system of claim 15, further comprising:
a detection module, stored in memory at the local gateway device, detects an event that triggers an additional topology discovery process; and
a topology-discovery module, stored in memory at the local gateway device, that initiates the additional topology discovery process in response to the event.

18. The system of claim 17, wherein the event that triggers the additional topology discovery process comprises at least one of:
an addition of a new gateway device to the network;
a restoration of a connection involving a communication interface included on the local gateway device;
a reboot of at least one gateway device included in the network; and
a topology change affecting the network.

19. The system of claim 15, wherein:
the transmission module sends, from the local gateway device, an additional query message that prompts the remote gateway device to provide an additional response message that facilitates completing the topology discovery process;
the receiving module receives, from the remote gateway device, the additional response message that facilitates completing the topology discovery process;
the mapping module:
in response to the additional response message:
identifies, within the additional response message, at least one characteristic of the first interface included on the remote gateway device; and
updates a translation table of the local gateway device based at least in part on the characteristic of the first interface identified within the additional response message by recording the mapping between the first interface and the second interface in the translation table of the local gateway device.

20. An apparatus comprising:
at least one storage device that stores a translation table configured to identify geographical redundancy groups that handle traffic involving subscriber devices;
at least one physical processor communicatively coupled to the storage device, wherein the physical processor:
receives, at a local gateway device included in a network, a query message that initiates a topology discovery process from a remote gateway device included in the network;
in response to receiving the query message:
identifies, within the query message, at least one characteristic of a first interface included on the remote gateway device; and
selects, for the first interface, a second interface included on the local gateway device based at least in part on the characteristic of the first interface identified within the query message;
sends, to the remote gateway device, a response message that:
includes at least one characteristic of the second interface included on the local gateway device; and
enables the remote gateway device to map the first interface to the second interface in connection with the topology discovery process.

* * * * *